A. H. ROIKJER.
CAMERA.
APPLICATION FILED DEC. 16, 1918.
1,393,829.
Patented Oct. 18, 1921.
5 SHEETS—SHEET 1.
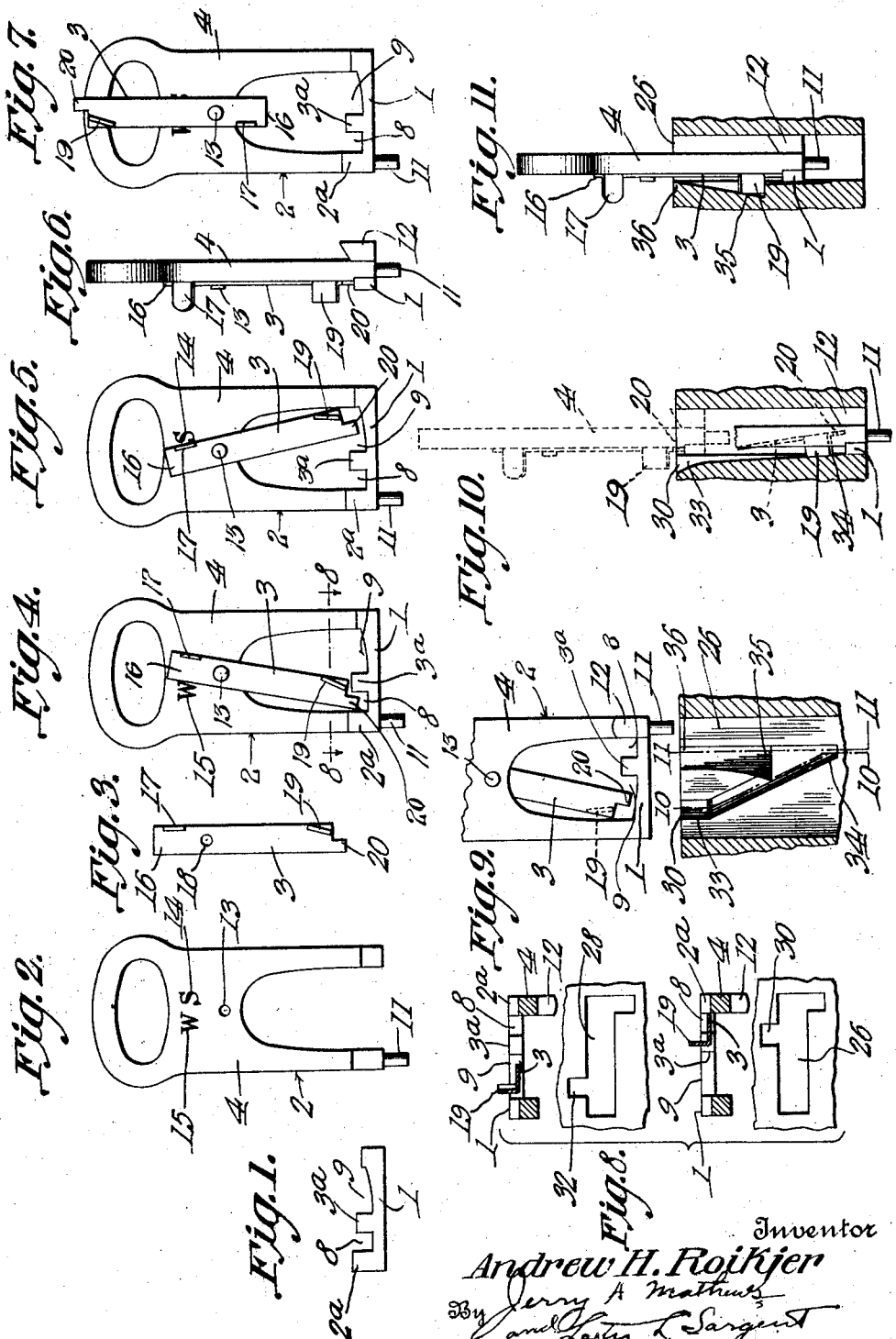
Inventor
Andrew H. Roikjer
By Jerry A Mathus
and Lester L Sargent
Attorney

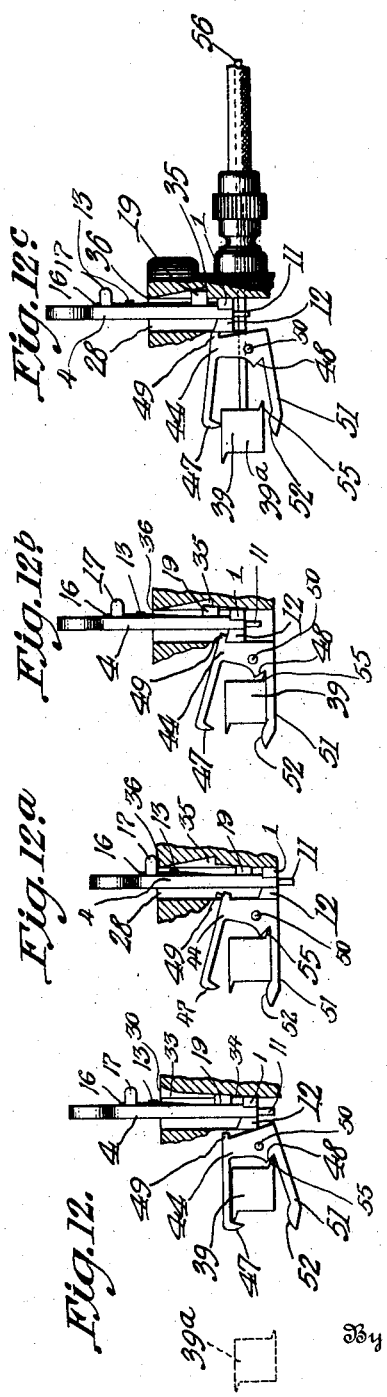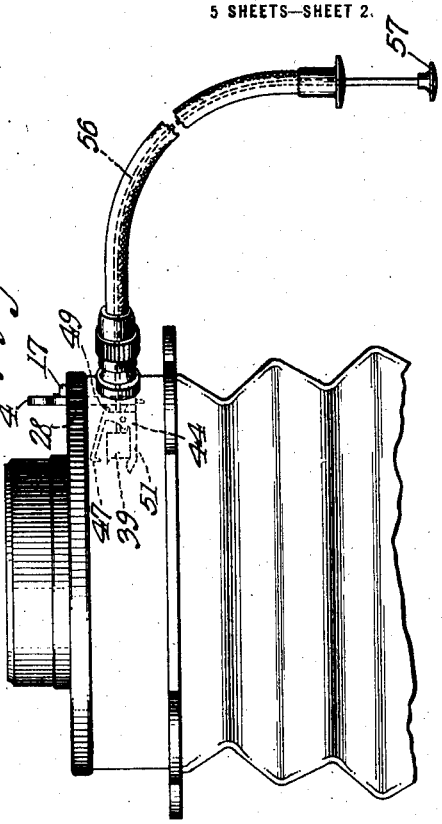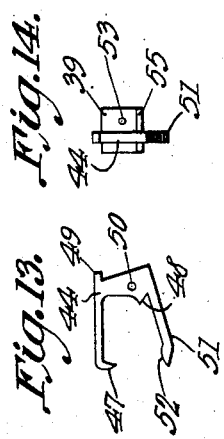

A. H. ROIKJER.
CAMERA.
APPLICATION FILED DEC. 16, 1918.
1,393,829.
Patented Oct. 18, 1921.
5 SHEETS—SHEET 3.
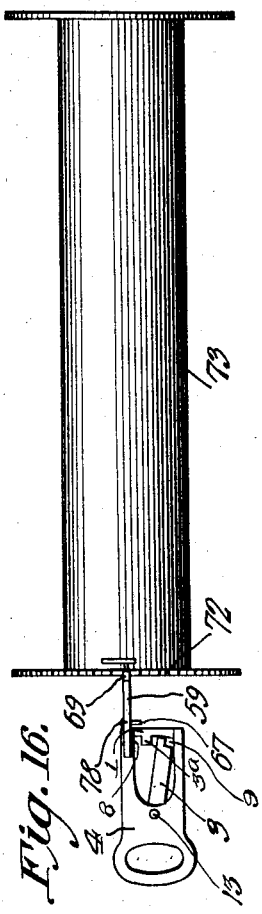
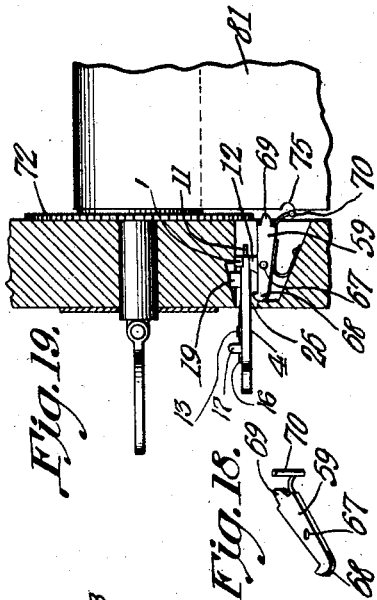
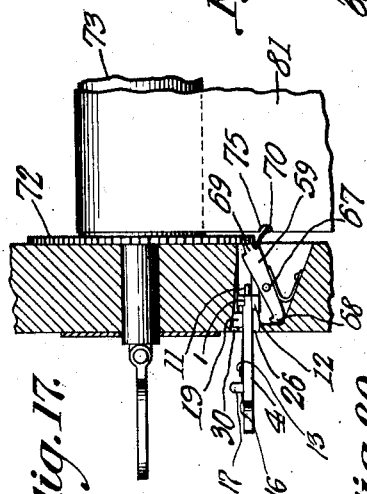
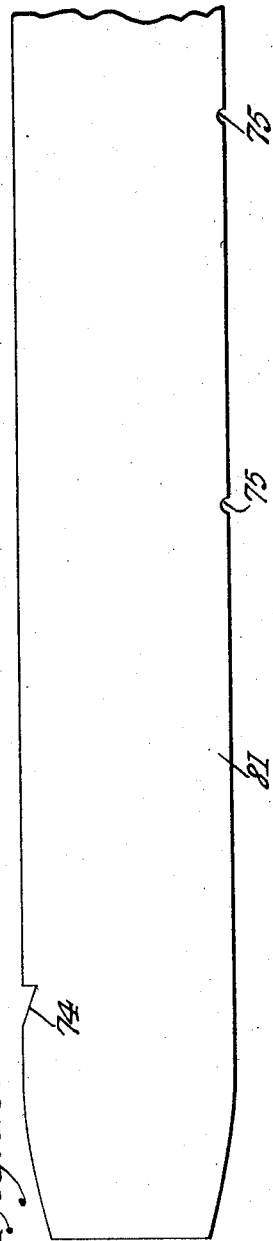
Inventor
Andrew H. Roikjer A. H. ROIKJER.
CAMERA.
APPLICATION FILED DEC. 16, 1918.
1,393,829.
Patented Oct. 18, 1921.
5 SHEETS—SHEET 4.
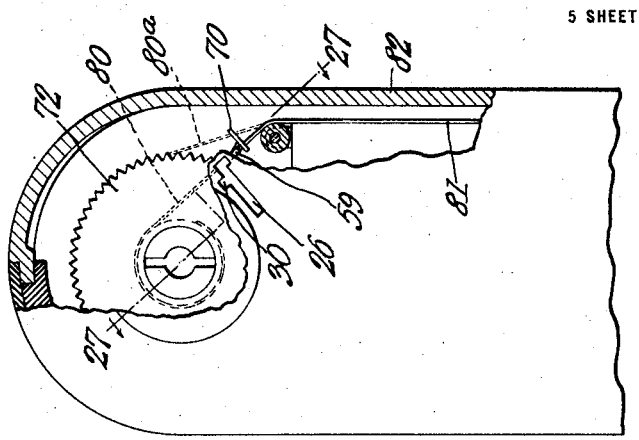
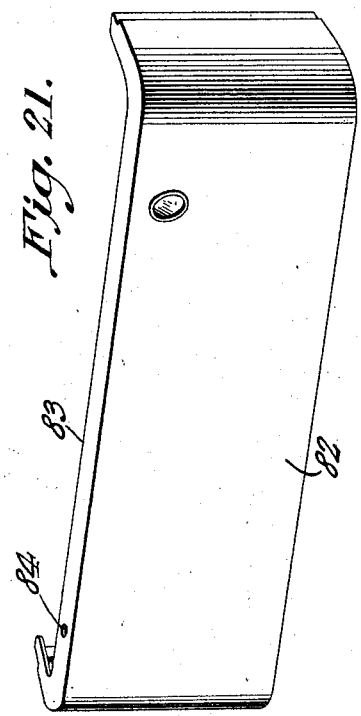
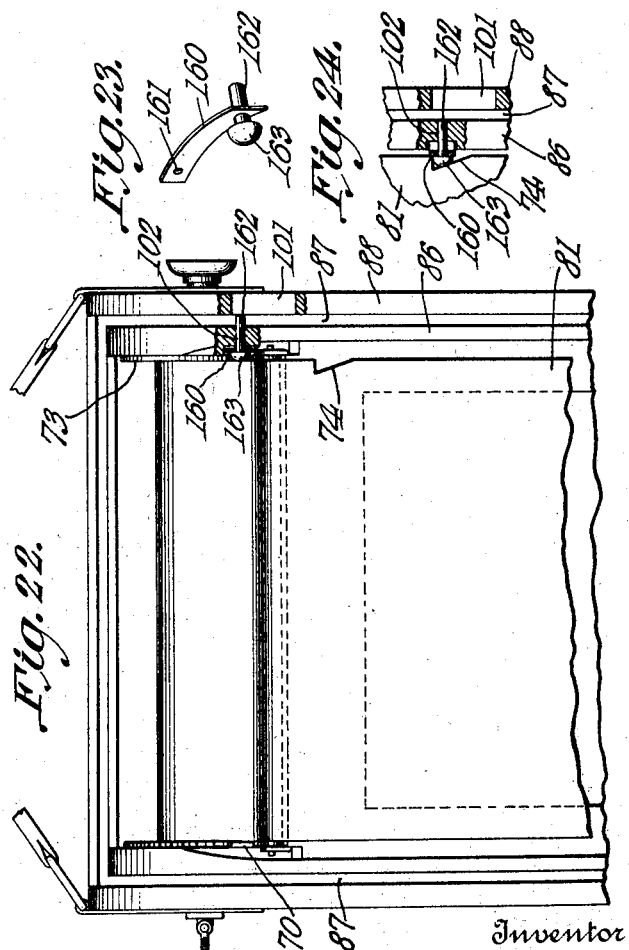
Inventor
Andrew H. Roikjer
By Jerry A Mathews
and Lester L Sargent
Attorney A. H. ROIKJER.
CAMERA.
APPLICATION FILED DEC. 16, 1918.
1,393,829.
Patented Oct. 18, 1921.
5 SHEETS—SHEET 5.
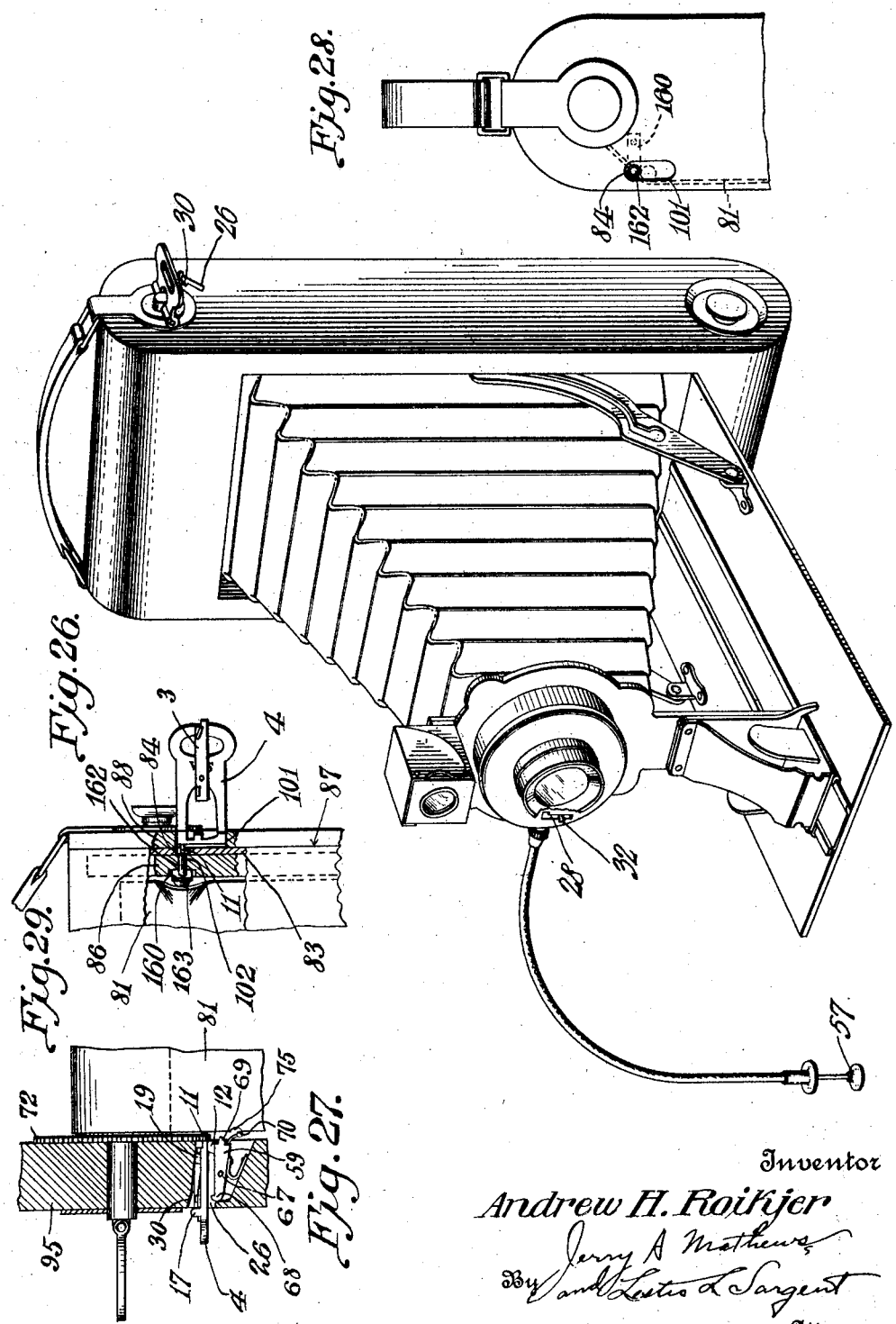
Inventor
Andrew H. Roikjer
By Jerry A Mathews
and Lester L Sargent
Attorney

UNITED STATES PATENT OFFICE.

ANDREW H. ROIKJER, OF BOISE, IDAHO.

CAMERA.

1,393,829.   Specification of Letters Patent.   Patented Oct. 18, 1921.

Application filed December 16, 1918. Serial No. 267,045.

*To all whom it may concern:*

Be it known that I, ANDREW H. ROIKJER, a citizen of the United States, residing at Boise, in the county of Ada and State of Idaho, have invented a new and useful Camera, of which the following is a specification.

The object of my invention is to provide a simple device which will make impossible the making of a double exposure or blank film, unless done intentionally; to provide a camera in which the mechanism is protected against tampering; and to provide an attachment for a camera which does not interfere in any way with any of the mechanisms of the camera, but controls those mechanisms and compels them to do the right thing at the proper time. With these and other objects in view, as more fully hereinafter set forth, my invention is illustrated in the accompanying drawings, in which—

Figure 1 is a detail view of one of the elements of the device, member 1;

Fig. 2 is a detail view of member 2;

Fig. 3 is a detail view of member 3;

Fig. 4 is a detail view of my latch device;

Fig. 5 is a similar detail view with member 3 in a different operative position;

Fig. 6 is an edge view of the device shown in Fig. 5;

Fig. 7 is a detail view of the latch device with latch 3 in reverse position;

Fig. 8 designates detail sectional views from the line 8—8 of Fig. 4, with latch 3 in its two extreme positions.

Fig. 9 is a detail elevational view, partly in section, illustrating the operation of the device;

Figs. 10 and 11 are detail views illustrating the operation of the device, on lines 10—10 and 11—11, respectively, of Fig. 9;

Figs. 12, 12$^a$, 12$^b$, and 12$^c$ illustrate the operation of my device at successive stages of the operation of members 44 and 4;

Fig. 13 is a detail view of member 44;

Fig. 14 is a detail end view of same;

Fig. 15 is an elevational view of the device applied to a camera;

Figs. 16, 17, 18 and 19 are detail views of the spool and latch mechanism;

Fig. 20 is a detail of the film, showing notches 74 and 75;

Fig. 21 is a perspective of the camera back;

Fig. 22 is a section through the camera longitudinally, showing the fastening means;

Fig. 23 is a detail perspective of member 160;

Fig. 24 is a detail sectional view of the locking device;

Fig. 25 is a side view showing the film being wound on the film spool at the commencement of the operation;

Fig. 26 is a perspective of the camera complete;

Fig. 27 is a detail of the film controlling device, viewed from the side of the camera;

Fig. 28 is a side view of a portion of the camera showing opening 101; and

Fig. 29 is a detail sectional view, partly in elevation, showing the key device.

Like characters of reference designate like parts.

Referring to the accompanying drawings in detail, I provide an F-shaped piece 1 having the protrusions 2$^a$ and 3$^a$, forming spaces 8 and 9, as shown in Fig. 1. Member 2 is a U-shaped member having a protrusion 12, a round extension 11, a hole through the same at 13. Member 2 bears the letters S and W, designated 14 and 15, respectively. Latch 3 is a pivotally mounted piece of spring steel having two raised portions 17 and 19, a hole at 18, an extension 20 and an extension 16. F-shaped piece 1 is fastened to the lower part of member 2, forming the device shown in Fig. 4, on which is pivotally mounted the latch 3. When the latch 3 is in the position shown in Fig. 4, its end 16 covers the letter "S" which is visible when the latch is in the position shown in Fig. 5, in which latter position portion 16 of the latch 3 covers the letter "W."

Referring to Fig. 26, I provide in the camera the opening 26 in proximity to the film winding parts; and an opening 28 in proximity to the shutter parts.

When the instrument 4 is positioned as shown in Fig. 5 it will pass into the shutter opening 28. When it is positioned as shown in Fig. 4 it will pass only into the film winding opening 26. When the device 4 is viewed from the section line 8—8 it would be seen disposed as shown in Fig. 8, top view. Projection 19 being on a line with channel notch 30 in the opening 26 when inserted in said opening. When withdrawn it can not again be forced into the same opening 26. Projection 19 has been shifted to a position in line with channel for notch 32 as shown in Fig. 8. Therefore the instrument 4 can then be inserted into the opening 28, and when forced into this opennig and withdrawn, projection 19 on latch 3 will come out as seen at 25 in Fig. 8. The reason for this change in position of projection 19 is disclosed in Fig. 9. The wall of the openings 28 and 26 have each a V-shaped channel, along which the projection 19 of latch 3 passes in its downward course, guiding projection 19 first inward and out of the space 8 and then toward space 9. At the entrance of this channel at portion 33, it is deeper than at portion 34 so that when the instrument 4 is forced downward as shown in Fig. 10, projection 19 is pressed inward in its downward course, the point 20 being forced out of the space 8, and as the instrument 4 continues in its downward course in the opening 26, the projection 19 following the channel pulls the spring or latch 3 away from space 8 toward space 9, and when latch 3 is withdrawn, projection 19 continuing to follow the course of the V-shaped channel toward portion 35. Thus it continues to pull the point 19 toward the space 9 until the extension 20 is even with the space 9, when the instrument 4 is withdrawn. The projection 19 having reached the portion 35 where the channel deepens, member 19 will spring out, making it impossible to force the instrument down into the same opening, but it can be withdrawn. Between portions 35 and 36 the channel narrows gradually forcing projection 19 inward until it is out of the channel at portion 36, when it will again spring out, making it again impossible to force the instrument downward. At this time it is impossible to again insert the instrument into the opening 26 as the latch 3 of instrument 4 is now in the position shown in Fig. 5, and when in this position it can be inserted only into the opening 28.

During the operation of latch 3 in its passage through the V-shaped channel as above described, an operation is performed by the opposite wall of said channel. I provide a metal pawl 59 having a protrusion 68, another projection 69, in which latter member is an opening 67, and I also provide on member 59 a shoe 70. Pawl 59 locks the film spool against turning when the point 69 is engaged in cogwheel 72 of the film spool, as shown in Fig. 17. I provide a film 81 having spaced niches 75, as shown in Fig. 20, spaced to separate successive exposures.

As shown in Fig. 17, shoe 70 is engaged in one of the niches 75, the film having been wound in, pulling projection 69 in the cogwheel 72, the pawl 59 being pivoted on 67.

Referring to Fig. 17, instrument 4 is shown being inserted into opening 26. The action on projection 19 in the V-shaped channel is taking place as previously described. At the same time, the protrusion 12 strikes the edge of pawl 59, forcing it away from the cogwheel 72 and at the same time forcing the shoe 70 out of the niche 75, causing the shoe 70 to rest on the edge of film 81 as seen in Fig. 18. The point 68 is thereby moved to a line with and in the path of protrusion 12 in member 4's outward movement. I provide a round pin 11 positioned to engage the cogwheel 72 and take the place of the pawl point 69. The film cannot be wound at this stage of the operation. The instrument 4 must be withdrawn until protrusion 12 stops it for farther withdrawal by reason of the point 68 being disposed in the V-shaped channel between the portions designated 35 and 36, making it impossible to force instrument 4 downward.

The film spool 73 at this time can be turned. The pawl point 69 is out of engagement with the cog wheel 72, and the round pin 11 is also out of engagement with it, leaving the film spool free in its action.

When the film is being wound, the shoe 70 glides along the edge of the film until it reaches the niche 75 which is one picture length of the film. The shoe will be pressed forward into the niche 75 by the U-shaped spring 60, and as the film is wound forward toward the film spool, the shoe 70 is carried toward the film spool, the pawl point 69 will again be forced into the cogwheel 72 as seen in Fig. 17, preventing the winding of any more film. As it is necessary both to force the pawl point 69 out of the cog wheel 72 to again wind the film, and to force the instrument 4 downward to force the pawl point 69 out of engagement with the cogwheel 72, and projection 19 being disposed between the portions 35 and 36 of the V-shaped channel, instrument 4 can not be forced downward. The point 68 at this time being out of the path of protrusion 12, the instrument 4 can be withdrawn. When withdrawn, projection 19 will be pushed inward in the V-shaped channel between portions 35 and 36. When projection 19 is out of the V-shaped channel at portion 26, as shown in Fig. 11, the instrument cannot be forced downward on account of projection 19 protruding beyond the opening at portion 36. Instrument 4 having gone into the opening 26 with latch 3 in the position shown in Fig. 4, and coming out with latch 3 moved to the position shown in Fig. 5, it cannot again be forced into opening 26.

But it will enter opening 28 to operate the shutter controlling parts.

Referring to the construction and operation of the film spool, etc., in Fig. 16, is illustrated how pawl 59 crosses cogwheel 72 of the film spool 73. The axis of the film spool and the axis of the pawl 59 are on planes that would intersect. Instrument 4 is shown in its relative position on entering opening 26 to the position of pawl 59.

Instrument 4 when in the position shown in Fig. 5 is positioned to enter the opening 28. Opening 28 is located at and controls the shutter parts. It has a V-shaped channel 32 disposed in the opposite direction from the channel 31 in the opening 26.

Opening 28 is provided with a novel metal locking member 44, shown in Fig. 13. Member 44 is provided with a hooked or pointed portion 47, a notch 48, an arm 51, and a curved extension 52. It is also provided with a pivot opening 50, and a projection 49.

In operation, shutter pin 39 must be moved forward to the dotted line 39ª in order to open the shutter. Shutter pin 39 is operable by a flexible spring controlled connection 56 inclosed in a suitable sheath and operated by a suitable finger piece 57. Point 47 is in the path of member 39, thus preventing its movement forward until locking member 44 is tilted upward as shown in Fig. 12 (A). And in order to get locking member 44 to tilt upward it is necessary to insert instrument 4 in the opening 28.

As the instrument 4 is forced downward the point 12 on the latch 3 strikes the edge of member 44, causing its upward tilting movement. A spring forces shutter pin 39 back from 39ª to 39 whenever released by the flexible connection 56. Member 39 thus passes between the opposed projections 47 and 52. The flange 55 engages in the notch 48 of the locking member 44, in the shutter pin's backward movement. When locking member 44 is tilted upward and flange 55 engages notch 48, member 44 is locked in the position shown in Fig. 12. When instrument 4 is withdrawn as shown in Fig. 12 (B), shutter pin 39 can be pressed forward to 39ª, as seen in Fig. 12 (C).

Referring to Fig. 12 (A) when instrument 4 is inserted as far as it will go it will be seen that it will be impossible to force shutter pin 39 forward, as the raised curved extension 52 is in its path. Locking member 44 cannot be tilted forward, being held in its position by protrusion 12 of member 4. Instrument 4 is prevented from being withdrawn entirely out of opening 28 on account of the projection 49 of member 44 being in the path of protrusion 12.

Projection 19 having traversed the course of the V-shaped channel, the instrument is now in the position shown in Fig. 4, projection 19 being positioned between portions 35 and 36 of the channel, prevents instrument 4 from being either pressed downward or withdrawn at this time. But shutter pin 39 can now be pressed forward to 39ª, and as it is pressed forward it strikes downward as shown in Fig. 12 (C). Shutter pin 39 passes to 39ª, causing the opening of the shutter, and making an exposure of the film in the camera. As soon as 39ª is released it will spring back, entering locking member 44 between its opposed projections 47 and 52. Shutter pin flange 55 being on a line with notch 48, when it engages same, locking member 44 is caused to tilt forward as shown in Fig. 12, at which time hook 47 will again be in the path of shutter pin 39. Instrument 4, at Fig. 12 (C), as shown, is released in its outward movement out of the opening 28, as projection 49 is out of the path of protrusion 12. But member 4 can not be forced downward on account of projection 19 being in the channel between the portions designated 35 and 36.

As instrument 4 is withdrawn, having gone in with the latch or key 3 as shown in Fig. 5, and coming out with latch 4 positioned as shown in Fig. 4, it will not now re-enter the opening 28. (Latch or key 3 is retained frictionally, or by other suitable means in the particular position to which it has been shifted.) But it will go into the opening 26, and as it is necessary to again insert the instrument 4 into opening 28 before the shutter can be again worked to cause a double exposure, and further as the instrument 4 will not have its latch 3 in the position shown in Fig. 5 until member 4 has been inserted in the opening 26, and as it is impossible to get instrument 4 to such position, as shown in Fig. 5, without winding one length of film, it can be understood that without premeditated tampering with the parts, it is impossible to either make double exposures or have blank films.

Referring to Fig. 14, the locking member 44 and shutter pin 39 are shown as viewed from the right hand side of Fig. 13. 53 designates the pin or operating end of flexible connection 56, by which shutter pin 39 is forced forward.

Fig. 15 shows the camera and shutter parts as viewed in top plan; and Fig. 26 is a perspective illustrating the relative positioning of parts on the camera.

I provide a camera back 82, as shown in Fig. 21, having side flanges 83, adapted to fit in a corresponding groove 87 on each side of the body of the camera, or between the two walls 86 and 88. As shown on Fig. 20, film 81 near its end is provided with a niche 74 on the opposite side from the spaced niches 75. I provide a spring 160, as shown in Fig. 23, an opening 161, a pin 162, and a head 163. This device is fastened to the camera body adjacent the edge of the notched film. Head 163 engages niche 74 of the film, the point 162 extending through the first wall 86 and the opening 84 in the camera back. After the film has been wound forward, as shown in Fig. 24, the pin 162 is caused to enter the opening 84, thus making it impossible to remove the camera back 82 from the camera until all of the film has been wound on the film spool. When this is done, the niched edge of the film will not interfere with member 89, springing back and taking the point 162 out of the opening 84, releasing camera back 82 from the camera.

Should the photographer at any time wish to remove camera back 82 before the film has all been wound on the film spool, he can operate as shown on Fig. 28. 101 designates an opening through the wall 88, as far as 86, as seen on Fig. 24. 102 designates a smaller opening corresponding with opening 101, through the wall 86, as shown in Fig. 29. The purpose of turning the parts into the position shown in Fig. 7 will be apparent on reference to Fig. 29. When instrument 4 is inserted in this opening 101, the point 11 enters the opening 102, forcing member 89 back, removing point 162 from opening 84, whereupon the camera back 82 may be removed.

On Fig. 25, 80 shows the film wound on the film spool at the commencement of the winding, showing it touching the lower edge of the shoe 70 of member 59. In Fig. 25, dotted line 80ª shows the position of the film when the film spool is full. It will be observed that the niche 75 will affect the shoe 70 in any part of the winding of the film.

The operation of the camera is further illustrated in Fig. 27 which is a view on line 27—27 of Fig. 25, with the point 19 of member 4 in the lower end of the channel, and the point 17 at the top of the outside surface of the wall 95, preventing the instrument 4 from moving farther into opening 26. Fig. 27 also shows that the protrusion 12 has forced the member 59 away from the film, and that the shoe 70 is out of the niche 75, and is resting on the edge of the film 80. The point 11 has engaged the cogwheel 72, having taken the place of point 69 of member 59, and which position would prevent winding of the film. Instrument 4, when withdrawn, can not be withdrawn entirely from opening 26, as pawl hook 68 is in the path of protrusion 12 of member 4's outward movement, preventing its further travel outward.

When projection 19 is positioned in the V-shaped channel between the portions 35 and 36 of said channel, the instrument 4 can not be forced downward or pulled outward. But the film can at this time be wound. The shoe 70 rests on the edge of the film preventing the point 69 from engaging cogwheel 72 until the shoe 70 reaches the niche 75. When the shoe 70 reaches the niche 75, the shoe 70 engaging in this niche will pull the point 69 into engagement with cogwheel 72. Pawl 59 being pivoted, will release projection 68 from the path of member 12, making it possible after one film length has been wound to renew same and preventing the winding further, as pawl point 69 prevents the turning of the film spool. The instrument 4 can then be removed.

On Fig. 15, member 4 is shown in the opening 28, with projection 19 not in the V-shaped channel, and as projection 17 prevents instrument 4 from moving any farther into opening 28, it will be seen as shown in Fig. 12 (C) the position of the members is such as to allow shutter pin 39 to pass in and out of member 44 as often as desired.

By getting a film without the niche 75, the shoe 70, resting on the edge of the film 80, the camera would be the same as the one customarily in use, in its operation, without changing the mechanism above described.

What I claim is:

1. In a camera, a locking member of substantially U-shape having opposed inwardly extending projections, said member having a notched portion on its inner edge and having a projection on its outer edge, substantially as shown.

2. In a camera, an actuating instrument comprising a handle portion and arms extending therefrom in a like direction, one of the arms having a protrusion, an F-shaped piece secured to the ends of the arm, one of the aforesaid arms having a round extension, and a latch member pivotally mounted on the instrument, said latch member having an extended end positioned in proximity to the F-shaped member, and having a projection near the end of said member, substantially as shown.

3. In a camera in combination with a locking member, a shutter pin having diagonally disposed flanges adapted to engage the locking member, substantially as shown.

4. In a camera, the combination of a camera body having a substantially V-shaped channel leading to the interior mechanism of the camera, an actuating instrument insertible into said opening, said instrument having a pivoted member having projections engaging the channel aforesaid, whereby the operation of the latch is controlled by the position and shape of the channel, substantially as described.

5. In a camera adapted to receive a film having spaced niches in one of its edges, the combination of means adapted to engage one of said niches, independent film-controlling mechanism, independent shutter-controlling mechanism, and an actuating key having a member functioning in one of its positions to release the shutter, and in another of its positions functioning to release the film controlling mechanism for winding the film under proper conditions, whereby to make a single exposure in each successive focal area of the film.

6. In combination with a camera, a shutter controlling device, a film operating and controlling mechanism, a shutter locking means for preventing its operation except under predetermined conditions, a manually controlled key adapted for alternative operation of the shutter locking device and the film controlling mechanism under predetermined conditions automatically, and a film locking mechanism.

7. In a camera adapted to receive a film having spaced niches in one of its edges, the combination of a shutter controlling device, a film controlling device, an actuating instrument, said instrument including a movable member adapted to engage and release the film controlling device and the shutter controlling device under predetermined conditions, the camera having a substantially V-shaped channel adapted to receive the movable member of the actuating instrument.

8. In combination with the apparatus described in claim 7, a film having spaced niches in one of its sides with which the film controlling device is adapted to operably engage at predetermined times, said niches being spaced the distance of one exposure length apart.

9. In a camera adapted to receive a film having spaced niches in one of its edges and a lock-releasing niche near one end in one of its edges, the combination of a shutter controlling device, a film controlling device, an actuating instrument, said instrument including a movable member adapted to engage and release the film controlling device and the shutter controlling device under predetermined conditions, the camera having a substantially V-shaped channel adapted to receive the movable member of the actuating instrument, and means for locking the removable back of the camera to the camera to prevent the removal of the film from the camera until the focal area of the film has been entirely used up.

ANDREW H. ROIKJER.